Figure 1:
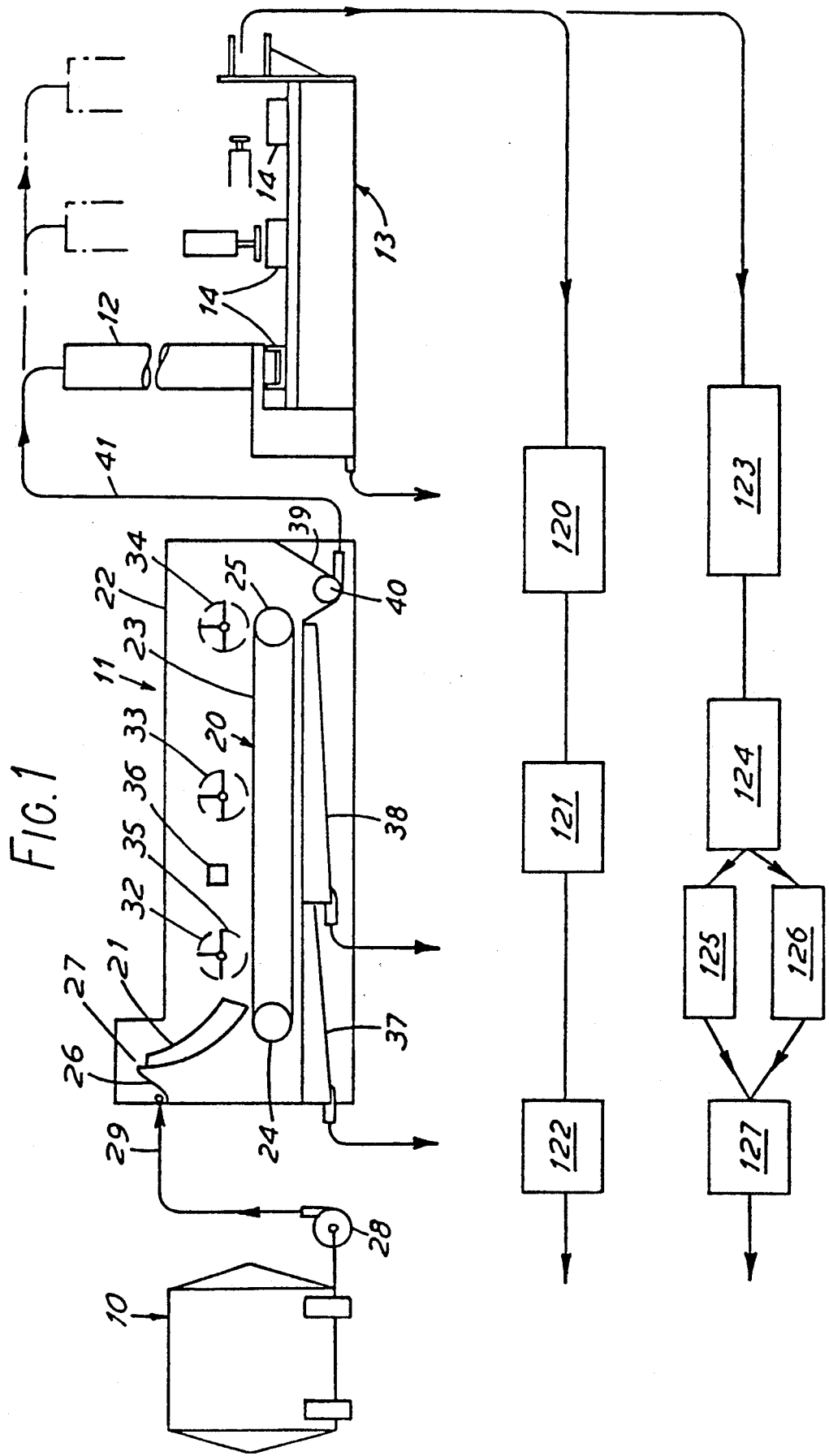

United States Patent [19]

Barlow et al.

[11] Patent Number: 5,082,681

[45] Date of Patent: Jan. 21, 1992

[54] METHOD AND APPARATUS FOR PRODUCING MOULDED CHEESE BLOCKS

[75] Inventors: Peter B. Barlow, Norton-Sub-Hamdon, United Kingdom; Ole M. Christiansen, 73 Malmo, Sweden

[73] Assignee: Alfa-Laval Cheese Systems Limited, Somerset, United Kingdom

[21] Appl. No.: 576,508

[22] PCT Filed: Mar. 30, 1989

[86] PCT No.: PCT/GB89/00326

§ 371 Date: Oct. 1, 1990

§ 102(e) Date: Oct. 1, 1990

[87] PCT Pub. No.: WO89/08978

PCT Pub. Date: Oct. 5, 1989

[30] Foreign Application Priority Data

Mar. 31, 1988 [GB] United Kingdom ............... 8807761

[51] Int. Cl.⁵ .................................................. A23C 19/00
[52] U.S. Cl. ........................................ 426/495; 99/454; 99/456; 425/85; 425/311; 426/512
[58] Field of Search ................ 426/478, 495, 512; 99/454, 456, 460; 425/85, 308, 311; 100/104, 126

[56] References Cited

U.S. PATENT DOCUMENTS 4,237,781 12/1980 Charles ................................ 99/454
4,539,902 9/1985 Brockwell et al. .................. 425/85

Primary Examiner—George Yeung
Attorney, Agent, or Firm—McAulay Fisher Nissen Goldberg & Kiel

[57] ABSTRACT

A curd and whey mixture is drained of loose whey on a conveyor and the dry curd fed into the top of a tubular perforated column (48,49) maintained under sub-atmospheric pressure to form a pillar of curd. A mass of curd severed from the lower end of the pillar is deposited in a mould (14) mounted on a turntable (13) rotatable to index the mould in succession at six pressing stations at each of which the curd is compressed for 45-120 seconds at a pressure of at least 4 bar in order to form a block of cheese with a rind firm enough to permit handling of the cheese block after ejection from the mould. At the first pressing station the curd is subjected to a sub-atmospheric pressure of −0.9 to −1.0 bar prior to compression. After the cheese block is ejected from the mould, the turntable returns the empty mould to the column for reception of another mass of curd.

44 Claims, 5 Drawing Sheets

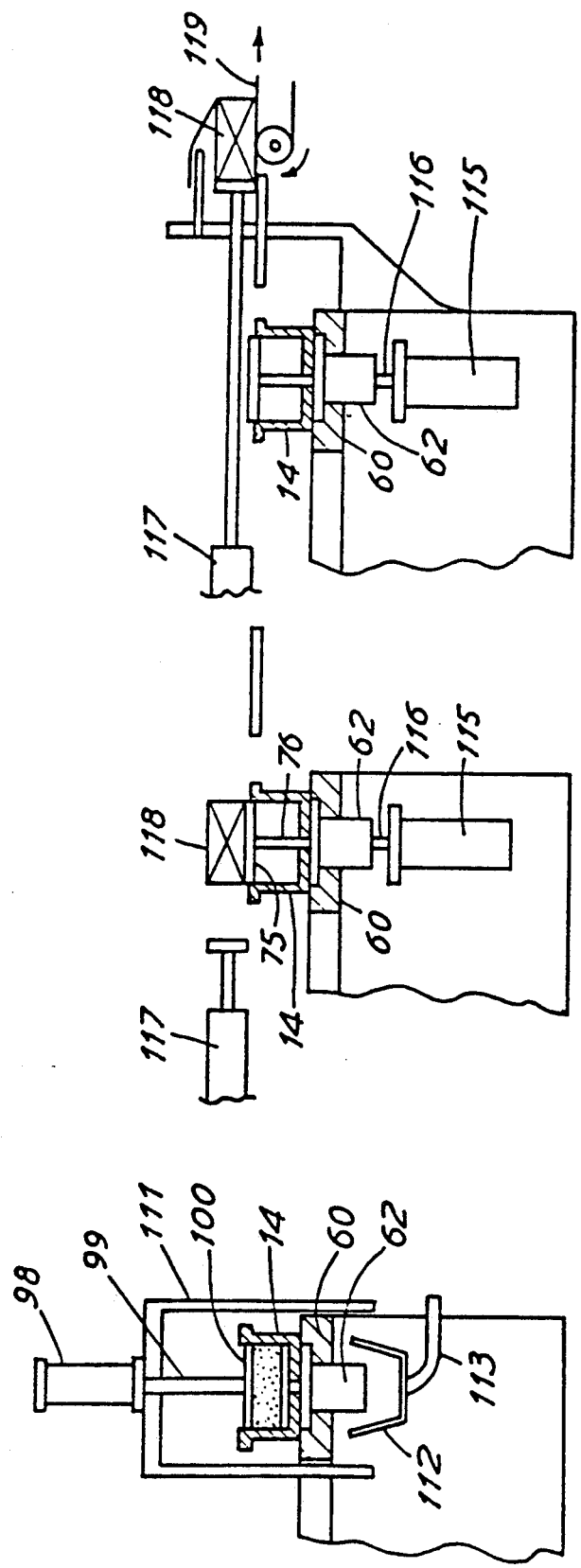

METHOD AND APPARATUS FOR PRODUCING MOULDED CHEESE BLOCKS

This invention relates to the production of finished moulded blocks of cheese from prepared cheese curd.

In one method of producing moulded cheese blocks in common use, a curd and whey mixture formed in a cheese vat and buffer tank is pumped into a tower where the curd is pre-pressed under the whey by gravity for approximately fifteen minutes, the whey being continuously drained from the tower, and the pre-pressed curd is discharged into loose moulds which are then transported to cheese presses. The curd is pressed in the moulds for a period of time between thirty minutes and ten hours, depending on the type of cheese being produced, to consolidate the particles of curd into blocks of cheese which are then discharged from the moulds to either holding moulds or directly into a brine bath or into water. Use of this method on a commercial scale requires a large number of moulds and pressing machines, and each mould has to be washed before being refilled with cheese curd.

Another method of producing moulded cheese blocks comprises draining off the loose whey from a curd and whey mixture to leave dry curd, salting and mellowing the curd, feeding the curd into the top of a perforated column maintained at a sub-atmospheric pressure to form a pillar of curd therein, lowering the pillar of curd so that the lower end thereof extends into a forming chamber, cutting off the lower end of the pillar of curd by a guillotine blade to deposit a mass of curd in the forming chamber, compressing the mass of curd against the guillotine blade to form a block of cheese, and ejecting the block of cheese from the forming chamber. The block of cheese produced by this method is very friable and difficult to handle. It is therefore common practice to wrap the block in film material and then package the wrapped block in a cardboard or wooden container convenient for handling while the cheese is maturing in storage.

The object of the invention is to provide an improved method and apparatus for producing moulded cheese blocks from curd which may be cheddared, milled, granulated, salted, mellowed, mixed with an additive, or given any other desired treatment known in the art, depending on the type of cheese to be formed from the curd. Such curd will hereinafter be referred to for convenience as prepared cheese curd.

According to the present invention there is provided a method of forming a block of cheese from prepared cheese curd, comprising feeding the prepared curd into a tubular perforated column so as to build up a pillar of curd in the column with the curd being fed onto the top of the pillar, the curd in the lower portion of the pillar being compressed by the weight of superimposed curd to press out whey therefrom through the perforations in the column, extracting air and whey from the column so as to maintain a sub-atmospheric pressure therein during the feeding of the curd into the column, severing the lower end of the pillar and depositing the mass of curd severed from the pillar into a cheese mould below the column, and compressing the mass of curd in the mould at a pressure of at least 4 bar for sufficient time to consolidate the mass of curd into a block of cheese with a rind firm enough to permit handling of the block of cheese after ejection from the mould.

The method of the invention arose from the discovery that, when cheese curd particles are assembled under vacuum to form a mass of cheese curd and the cheese curd then subjected to a high pressure of at least 4 bar in a mould, the pressure between the cheese curd and the walls of the mould tends to form the outer layers of the mass of curd into a rind or skin in a short period of time. The minimum period of time for forming a rind which provides any desired firmness to a block of cheese depends, inter alia, upon the nature of the cheese curd, the degree of sub-atmospheric pressure in the column in which the curd particles are assembled, and the compressive force exerted on the curd in the mould, but can readily be determined by trial and experiment. The mass of curd in the mould is preferably subjected to several separate compressive operations by moving the mould containing the curd into a plurality of pressing stations in succession and compressing the mass of curd in the mould at each of the pressing stations. As an example, a suitable rind can generally be formed on a mass of curd assembled under vacuum by compressing the curd in a mould at a pressure of between 6–8 bar for a period of time between 45 and 120 seconds at each of six separate pressing stations. The mass of curd in the mould can conveniently be compressed by forcing into the mould a plunger which is a close sliding fit against the side walls of the mould.

In the method of the invention, the mould from which a cheese block is ejected after compression therein can conveniently be returned directly to the column for reception of a further mass of curd. It is then not necessary to wash each mould between successive fillings.

In the method of the invention, the mass of curd is assembled within the column while under sub-atmospheric pressure, so that there is little or no air separating the particles of curd and the particles are forced into close contact with one another by the weight of superimposed curd and readily fuse together, while the free moisture of the curd is reduced. In an improved modification of the invention, the mass of curd in the mould is also subjected to a sub-atmospheric pressure within the range $-0.5$ to $-1.0$ bar to extract air from the surface layers of the mass of curd in the mould prior to the compression of the curd in the mould. The mass of curd in the mould is preferably subjected to a sub-atmospheric pressure lower than that in the column, for example the sub-atmospheric pressure in the column may be in the range $-0.6$ to $-0.9$ bar, and the mass of curd in the mould subjected to a sub-atmospheric pressure in the range $-0.9$ to $-1.0$ bar prior to the compression thereof in the mould.

According to the invention there is also provided apparatus for forming blocks of cheese from prepared cheese curd comprising a tower having a hollow column therein, vacuum means for extracting air from the tower to obtain a sub-atmospheric pressure therein, means for directing the curd into the top of the tower to form a pillar of curd in the column while the tower is at said sub-atmospheric pressure, means for removing from the tower whey expressed from the lower end portion of the pillar of curd due to the weight of curd superimposed thereon, the hollow column having apertures in the wall thereof for passage of whey pressed out of the curd, a mould, and means for severing the lower end of the pillar of curd and depositing the mass of curd severed from the pillar into the mould, wherein the apparatus includes means operable to compress the mass of curd in the mould at a pressure of at least 4 bar for sufficient time to consolidate the mass of curd into a block of cheese with a rind firm enough to permit handling of the block of cheese after ejection from the mould.

The apparatus of the invention preferably includes a turntable supporting a plurality of moulds thereon, the turntable being rotatable to register each mould in succession with a loading station below the tower, with at least one pressing station, and with an unloading station, the or each pressing station being fitted with said means operable to compress the mass of curd in a mould registered with the pressing station.

Apparatus for producing blocks of cheese in accordance with the method of the invention will now be described, by way of example, with reference to the accompanying drawings, in which:

FIG. 1 is a diagrammatic representation in elevation of the apparatus.

Figure 2:
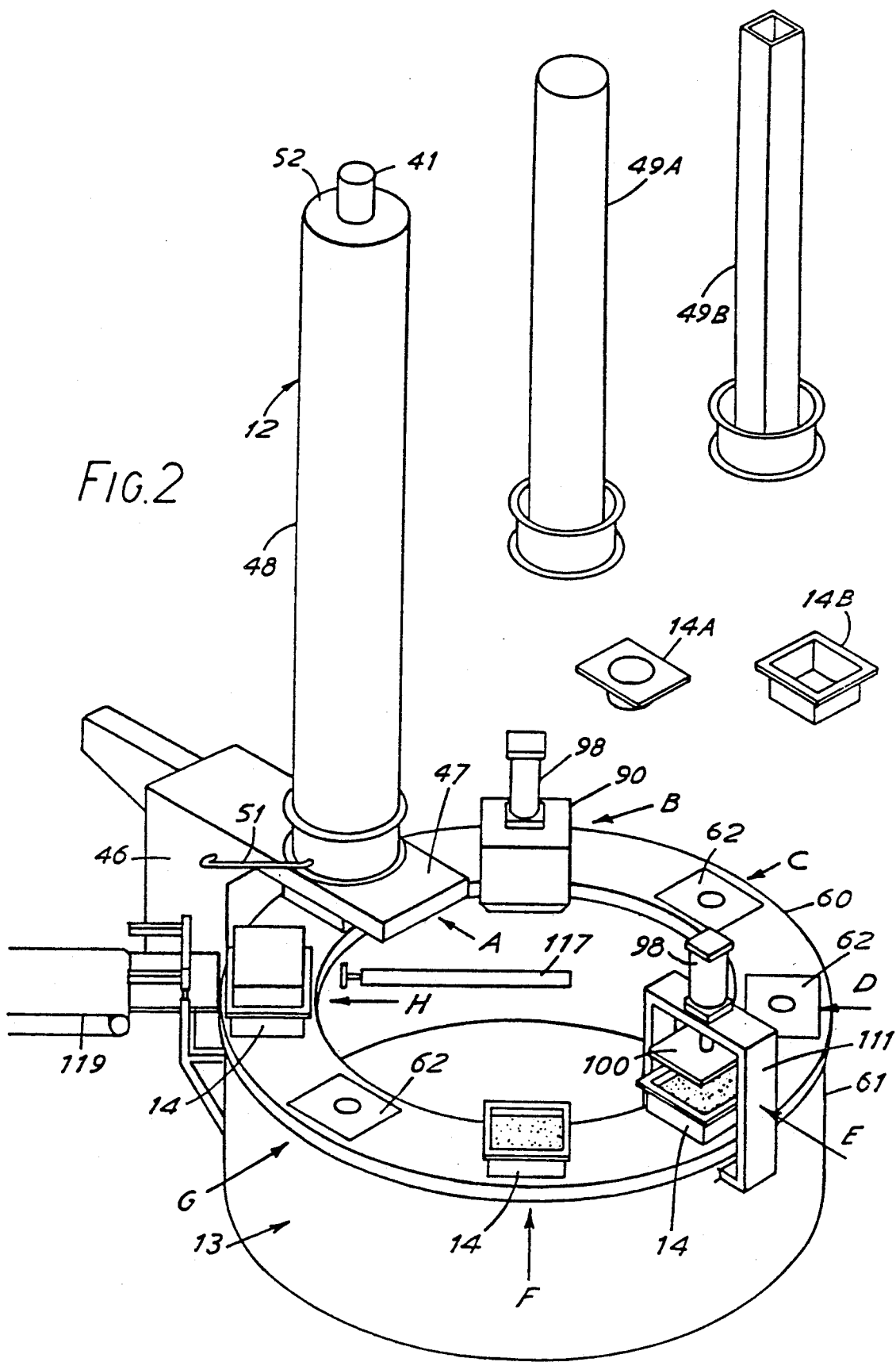
Figure 5:
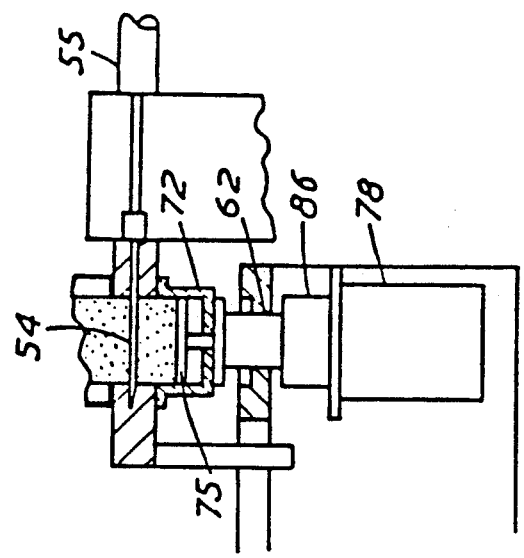
Figure 4:
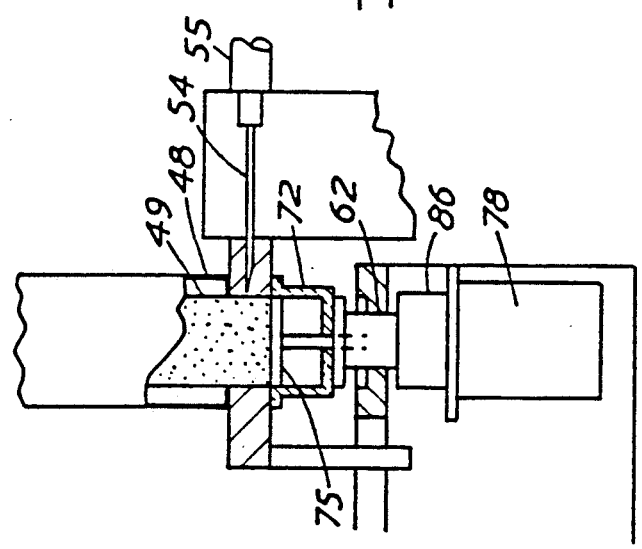
Figure 3:
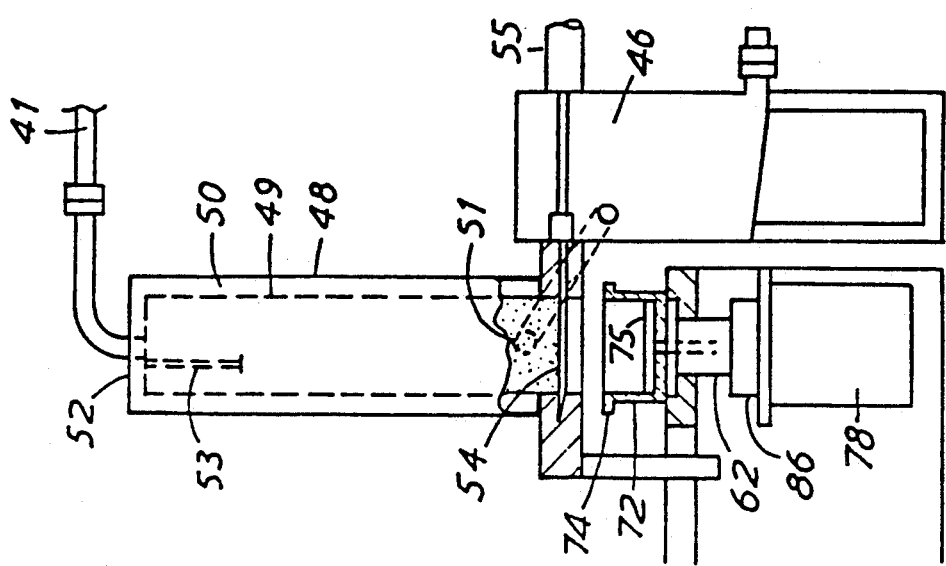
Figure 6:
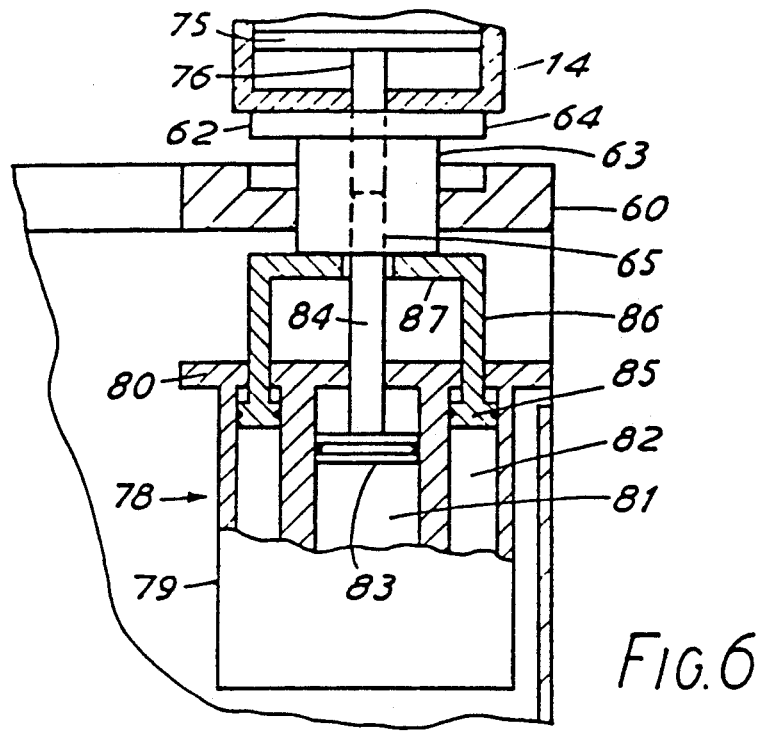
Figure 7:
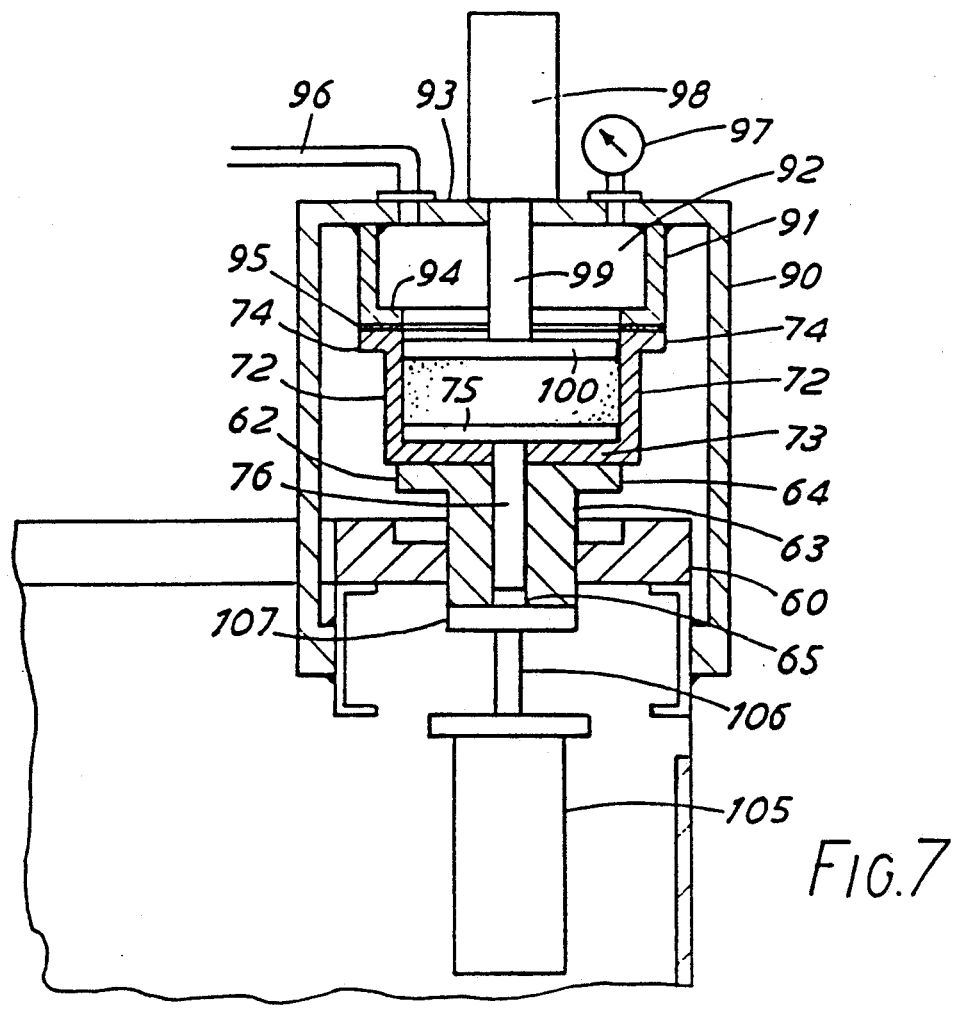

FIG. 2 is a diagrammatic representation in perspective of the tower, the turntable and two of the mould presses of the apparatus, and FIGS. 3-5 are diagrammatic elevation views of the tower and parts of the turntable and associated equipment illustrating the operational sequence in filling a mould with cheese curd, FIG. 6 is an elevation view on a larger scale of the mould and dual elevator of FIG. 5, showing the elevator partly in section, FIG. 7 is a sectional elevation of the first mould press showing the pressing of curd in a mould under vacuum, and FIGS. 8-10 are diagrammatic elevation views of the parts of the turntable and associated equipment illustrating further pressing of the curd in the mould to form a block of cheese, and subsequent ejection of the cheese block from the mould.

The apparatus shown in the drawings comprises a cheese vat 10 for forming a curd and whey mixture, a conveyor unit 11 for draining the whey from the curd to leave dry curd and then salting and mellowing the curd, a tower 12 for consolidating the curd, a vacuum reservoir and pump (not shown) for extracting air and whey from the tower so as to maintain a sub-atmospheric pressure in the tower during feeding of the curd into the tower, and a turntable 13 for use in transporting moulds 14 in succession between a loading station in which the moulds are filled with curd from the tower, pressing stations in which the curd is pressed in the moulds, and an unloading station in which the pressed curd is ejected from the moulds as blocks of cheese.

The cheese vat 10 is of conventional construction and suitable for rennetting milk, cutting the resulting curd, and stirring the curd and whey mixture by processes well known in the art and not forming part of this invention. The apparatus may also include a buffer tank for reception of the curd and whey mixture from the cheese vat.

The conveyor unit 11 comprises an endless belt conveyor 20 and a drainage screen 21 at the upstream end of the belt conveyor, the belt conveyor and drainage screen being enclosed within a housing 22. The endless belt 23 of the conveyor 20 is mounted on end sprockets 24, 25 arranged so that the upper run of the belt is substantially horizontal, the belt having apertures for drainage of whey. The belt preferably consists of a plurality of transverse slats interconnected by links at the ends of the slats as described in British patent specification No. 2186251A. The drainage screen 21 consists of parallel bars which are inclined downwards from the upstream to the downstream end of the screen, the bars being curved with the angle of inclination to the horizontal substantially greater at the upstream end than at the downstream end. The drainage screen can conveniently be of the construction described in Canadian patent specification No. 1133847. The housing 22 is fitted with a supply tank 26 having a weir 27 overhanging the upstream end of the drainage screen, and a rotary pump 28 and pipe 29 are arranged to supply the mixture of curd and whey from the cheese vat 10 (or the buffer tank) to the supply tank 26.

The housing 22 is also fitted with three rotary agitators 32, 33, 34 spaced apart along the upper run of the endless belt 23 and operable to stir a curd and whey mixture on the belt and thereby assist in the drainage of the whey. Each of the agitators has three paddles 35 arranged so that the agitator may be set in an inoperative position in which all the paddles are spaced well above the belt 23. A salting device 36 is positioned above the belt 23 between the upstream agitator 32 and the intermediate agitator 33, the device 36 being operable to distribute salt on the curd on the belt. A tray 37 is positioned below the upstream end of the conveyor 20 for collection of unsalted whey draining through the section of the conveyor upstream of the salting device, and a further tray 38 is positioned below the remainder of the conveyor to collect salted whey draining from the remainder of the conveyor. The downstream end of the conveyor unit is provided with a tank 39 for reception of curd discharged from the belt conveyor 20, and with a power driven auger 40 for feeding curd from the tank 39 into a pipe 41 leading to the top of the tower 12.

The tower 12 comprises a hollow base 46 (FIG. 2), the upper end of which has a hollow portion 47 which projects to one side of the remainder of the base, a hollow external column 48 mounted on the overhanging portion 47 of the base 46, and a hollow internal column 49 (FIG. 3) mounted inside the external column, the lower end of the internal column projecting into an aperture (not shown) in the overhanging portion 47. The internal column co-operates with the external column to form a passageway 50, and the internal column is formed with a plurality of small apertures for drainage of whey into the passageway 50. A pipe 51 extends between the lower end of the passageway 50 and the interior of the base 46 which acts as sump for whey drained from the tower. The top of the external column 48 is closed by an end plate 52, and the end of the pipe 41 from the conveyor unit 11 projects downwards through a central aperture in the plate 52 and opens into the interior of the internal column 49 at the upper end thereof. The wall of the pipe 41 is an airtight seal in the aperture in the end plate 52. The upper end of the internal column 49 is fitted with a probe 53 (FIG. 3) for providing a signal when curd in the tower reaches a predetermined high level. A guillotine blade 54 is mounted inside the hollow overhanging portion 47 of the base and is movable by a piston and cylinder unit 55 between a closed position in which the blade extends across and closes the lower end of the internal column 49 and an open position in which the blade is withdrawn wholly clear of the lower end of the internal column.

As shown in FIGS. 2 and 3, the turntable 13 comprises an annular rotary platform 60 mounted on an annular frame 61. The rotary platform 60 is fitted with eight elevator tables 62 spaced at equal distances around the platform, each elevator table comprising an upright shaft portion 63 (FIG. 6) axially slidable in a vertical bore in the platform and a head portion 64 which fits into a recess in the platform when the elevator table is in its lowermost position. The shaft portion 63 extends downwards below the platform. The elevator table has a central bore 65. The rotary platform 60 supports eight cheese moulds 14 mounted one on each of the elevator tables 62, and the platform is rotatable by power means (not shown) to register each elevator table together with its mould in succession with a loading station A, six pressing stations B, C, D, E, F, G and an unloading station H spaced at equal intervals around the frame 61. The turntable is arranged so that a mould 14 at the loading station A is directly below the tower 12.

As shown more clearly in FIG. 7, each mould 14 comprises upright side walls 72, a base 73 integral with the side walls, an outwardly projecting horizontal flange 74 at the top of the side wall, and a bottom plate 75 mounted on the top of an upright rod 76 which extends downwards through an aperture in the base 73 and is mounted as a close sliding fit in the central bore 65 in the associated elevator table 62. The bottom plate 75 is a close sliding fit against the side walls 72 of the mould around the internal periphery thereof. The mould is open at the top and has an internal transverse cross-section substantially equal to that of the internal transverse cross-section of the internal column 49 of the tower. The walls of the mould are lined internally with perforated material, or other material which permits drainage of whey therethrough.

The annular frame of the turntable is fitted at the loading station A with a dual elevator 78 operable to lift an elevator table and the bottom plate of the mould on the table, independently of one another, when the elevator table is in register with the loading station. As shown in FIG. 6, each dual elevator 78 comprises an upright cylinder block 79 having a cylinder head 80, an inner cylinder chamber 81 and an annular outer cylinder chamber 82 co-axial with and surrounding the inner cylinder chamber 81. The inner chamber 81 is fitted with a piston 83 connected to a piston rod 84 which extends through a central opening in the cylinder head and the outer cylinder chamber 82 is fitted with an annular piston 85 connected to a tubular piston rod 86 which extends through an annular opening in the cylinder head. The upper end of the tubular piston rod has an end wall 87 formed with a central opening for passage of the piston rod 84. The dual elevator is positioned below the annular platform of the turntable, at the loading station A, with the cylinder head 80 secured to the frame of the turntable.

The dual elevator is operable by supply of hydraulic fluid to the annular chamber 82 to raise the tubular piston rod 86 into engagement with the elevator table 62 in register with the loading station A and thereby lift the elevator table to engage the mould thereon with the underside of the tower (FIGS. 4, 5 and 6). The dual elevator is also operable by supply of hydraulic fluid to the inner chamber 81 to raise the piston rod 84 into the central bore 65 in the elevator table and engage against the lower end of the rod 76 on the bottom plate 75 of the mould and thereby raise the bottom plate within the mould when the mould is held against the bottom of the tower.

At the first pressing station B, the annular frame of the turntable is fitted with a subframe 90 (FIG. 7) in the form of an inverted U which straddles the elevator table and mould at the pressing station. A tubular wall 91 of a vacuum chamber 92 depends from the underside of the cross piece 93 of the subframe 90, the lower end of wall 91 terminating in an annular flange 94 with dimensions corresponding to those of the flange 74 on the moulds. The lower surface of flange 94 is fitted with a seal 95. The cross piece 93 of the subframe 90 is fitted with a tube 96 for evacuating air from the vacuum chamber and with a gauge 97 for indicating the pressure in the vacuum chamber 92. A piston and cylinder unit 98 is mounted on the crosspiece 93 with the piston rod 99 extending downwards through a sealed opening in the crosspiece, and a pressing plate 100 is fitted on the lower end of the rod 99, the pressing plate being of a size to be a close sliding fit in the mould around the internal periphery thereof. The annular frame of the turntable at the pressing station B is fitted with an upright piston and cylinder unit 105 having a piston rod 106 formed at its upper end thereof with a head 107 which is directly below the elevator table 62 in register with the station B, the piston and cylinder unit 105 being operable to engage the head of the piston rod with the table 62 and lift the table together with the mould thereon.

At each of the remaining pressing stations C–G the annular frame of the turntable is provided with a subframe 111 (FIGS. 2 and 8) in the form of an inverted U which straddles the elevator table and mould at the pressing station. The subframe 111 is provided with a piston and cylinder unit 98, piston rod 99 and pressing plate 100 similar to the corresponding components at the pressing station B. These pressing stations are however not provided with a vacuum chamber. The part of the annular frame of the turntable below the subframe has a trough 112 and a drainage duct 113 for collection of whey pressed out from the curd in the moulds at the pressing stations.

At the unloading station H (FIGS. 9 and 10), the annular frame of the turntable is fitted with a piston and cylinder unit 115 having a piston rod 116 aligned with the rod 76 on the bottom plate 75 of a mould in register with the station. The piston and cylinder unit 115 is operable to raise the rod 116 into abutting engagement with the rod 76 and, upon further upward movement of the rod 116, to raise the rod 76 and bottom plate 75 within the mould to a level at which the bottom plate is above the mould. The annular frame at the unloading station is also provided with a power operated ram 117 operable to slide a cheese block 118 on the bottom plate onto a take-away conveyor 119.

In operation, a curd and whey mixture in the cheese vat 10 is fed by the pump 28 and pipe 29 into the supply tank 26, and the curd and whey mixture in the supply tank flows over the weir 27 and onto the drainage screen 21 where loose whey is drained off into the tray 37. The curd slides down the screen and onto the endless belt 23 to form a layer of curd which is moved by the belt at a slow speed below the agitators 32, 33, 34 and below the salting device 36. The agitators may be rotated so that the paddles 35 stir the curd and, in the case of the agitator 33, mix the salt into the curd. The salting device may however be omitted, or left inoperable, and the agitators left in the inoperative position as explained above, or the conveyor unit 11 may be fitted with more or less than the three agitators shown, depending upon the type of cheese being produced. The curd discharged from the endless belt drops into the tank 39 and the auger 40 feeds the curd into the pipe 41.

A vacuum is initially created in the tower by moving the guillotine blade 54 into the closed position so as to seal the lower end of the internal column 49, as shown in FIG. 3 and then connecting the tower to a vacuum reservoir (not shown). The resulting sub-atmospheric pressure in the tower causes curd from the auger to be drawn up the pipe 41 and into the top of the tower. The movement of the curd up the pipe 41 may be assisted by blowing air into the pipe adjacent the auger. The curd builds up on the guillotine blade to form a pillar of curd within the internal column. When the pillar of curd builds up to the level of the probe 53, control means (not shown) stops the auger 40 to cut off the supply of curd until the level of curd drops below a predetermined lower level. Whey is pressed out of the curd in the pillar by the weight of superimposed curd, the whey passing through the apertures in the wall of the internal column, down the drainage passageway 50 between the internal and external columns and through the pipe 51 into the sump in the hollow base 46 of the tower. The whey is pumped out of the sump, and air entering the tower with the curd is pumped out to maintain the tower at the desired sub-atmospheric pressure. The pressure is preferably in the range −0.6 to −0.9 bar. The degree of consolidation of the individual particles of curd in the lower portion of the pillar is dependent on the sub-atmospheric pressure in the tower.

When the pillar of curd has built up to the level of the upper probe 53, the elevator table 62 and the mould thereon in register with the loading station A is raised by the elevator 78 as previously described to seal the flange 74 on the mould against the underside of the tower and the bottom plate 75 of the mould is raised by the elevator 78 to the top of the mould. The guillotine blade is then withdrawn to allow the pillar of curd to slide down the tower and onto the bottom plate 75, as shown in FIG. 4. The bottom plate 75 together with the pillar of curd are then lowered by the elevator 78 a distance determined by the desired size of cheese block to be produced, and the guillotine blade is driven into its closed position as shown in FIG. 5 to cut off a mass of curd from the lower end of the pillar of curd. The elevator table and mould are then lowered onto the rotary platform while the bottom plate 75 supporting the mass of curd thereon is lowered onto the base of the mould. The rotary platform is then indexed to register the filled mould with the first pressing station B and an empty mould with the loading station A.

During the period in which an empty mould at the loading station A is being filled with a mass of curd, the elevator table supporting a filled mould at the pressing station B is raised by the piston and cylinder unit 105 to seal the flange 74 on the filled mould against the flange 94 on the underside of the vacuum chamber 92 as shown in FIG. 7. Air is then extracted through tube 96 to create a very low sub-atmospheric pressure in the chamber 92 and in the interior of the mould, preferably in the range −0.9 to −1.0 bar. The pressure plate 100 is then forced downwards by the piston and cylinder unit 98 to compress the mass of curd in the mould at a pressure of at least 4 bar, and preferably within the range 6 to 8 bar. The mass of curd is compressed at this pressure for a period of time between 45 and 120 seconds and during this period the gaseous pressure in the vacuum chamber and the mould is raised to atmospheric pressure. The elevator table and the mould thereon is then lowered onto the annular platform immediately prior to the next indexing movement of the turntable.

During the period in which an empty mould at the loading station A is being filled with a mass of curd, and the filled mould at the pressing station B is being held against the vacuum chamber for compression of the cured under vacuum, the pressing plate 100 at each of the other pressing stations C–G is forced downwards by the associated piston and cylinder unit 98 into the mould in register with the pressing station so as to compress the mass of curd therein at a pressure of at least 4 bar, and preferably in the range 6 to 8 bar, for a period of time between 45 and 120 seconds. The mass of curd in each mould is thus pressed six times, that is while in register with each of the six pressing stations in turn, with the first compression effected under a low sub-atmospheric pressure. Any whey pressed out of the curd is drained away through the trough 112 and duct 113. The pressure on the curd in the mould consolidates the mass of curd into a block of cheese 118, and the pressure between the cheese block and the walls of the mould tend to form the outer layers of the cheese block into a skin which imparts sufficient firmness to the block to enable it to be handled separately.

When the rotary platform is indexed again to register the filled mould with the unloading station H, the bottom plate 75 is forced upwards by the piston and cylinder unit 115 to raise the block of cheese 118 out of the mould. The block of cheese is pushed off the plate 75 and onto the take-away conveyor 119, by the ram 117. The conveyor then transports the cheese block to a station 120 (FIG. 1) where it is vacuum sealed in a plastics bag, then to a station 121 where the wrapped cheese block is encased in a carton, and finally the conveyor transports the cartoned cheese block to a cool store 122 for maturing. Alternatively, in a process in which the curd is not salted in the conveyor unit 11, the conveyor may transport the cheese block to a cooling zone 123 and then to a brining system 124, before transporting the cheese blocks to either a station 125 for ripening and treating the cheese or to a station 126 for packing the cheese block, and then finally transporting the cheese block to a store 127.

The size and shape of the cheese blocks produced by the apparatus can readily be varied as desired by replacing the internal column 49 by another column, for example by columns 49A or 49B as shown in FIG. 2, with the desired internal cross sectional configuration and dimensions. It will of course also be necessary to replace the moulds 14 by corresponding moulds 14A or 14B having the same internal cross sectional configuration and dimensions as the internal column 49A or 49B respectively. The depth of the cheese blocks can of course be controlled by regulating the distance which the pillar of curd is lowered before operation of the guillotine blade.

With the apparatus of the invention as described above, it is easy to change the variety of cheese being produced and the size of the cheese block. The apparatus can readily be adapted for fully mechanized production with minimal labour and, due to the small number of moulds required, it occupies relatively small floor space and does not require any special flooring. The apparatus provides effective weight control of the cheese blocks and also control of all whey discharged from the pressing. A good yield is provided owing to consistent moisture content throughout the whole batch, low losses of cheese fines in the whey since the whey is filtered through the curd in the column, and no loss of cheese particles during mould filling. Consistent product quality can be achieved owing to the enclosed system, which substantially eliminates the risk of infection and enables good temperature control of the product during operation. Moreover clean-in-place facilities can readily be incorporated in the apparatus.

The apparatus of the invention is suitable for the production of hard and semi-hard types of cheese. For the production of particular types of hard cheese in which more extensive drainage of whey is required, the drainage conveyor unit 11 shown in the drawings may be replaced by a drainage unit having two, three, four or more belts, for example a drainage unit having four belts as shown in U.S. Pat. No. 4,309,904 Alternatively, for the production of particular types of semi-hard cheese in which extensive de-wheying and salting is not required before consolidation of the cheese particles in the tower, the entire conveyor unit 11 may be replaced by a de-wheying screen, similar to the screen 21, where surface whey is separated from the curd and the curd falls directly from the de-watering screen into an auger from which it is fed either by vacuum or under air pressure into the top of the tower.

The relation between the total time during which the curd is pressed in the moulds and the time spent by the curd in the tower may be varied as desired by varying the number of moulds and pressing stations. For example, the turntable may be fitted with four moulds and two pressing stations, or sixteen moulds and fourteen pressing stations.

To facilitate the formation of a skin on the surfaces of the cheese block in contact with the walls of the moulds, each mould may be lined internally with cloth or any other suitable sheet material adapted to become embedded in the outer surface of the cheese block during the pressing operation. A fresh lining would of course have to be inserted in each mould during passage from the unloading station to the loading station. Alternatively, the walls of the mould may be heated during the pressing operation and/or between pressing operations, to melt the fat in the surface layers of the cheese blocks.

Each mould may, if desired, be subdivided by vertical partitions into a plurality of compartments, for example six or eight compartments, and the pressing plate 100 at each pressing station fitted with a corresponding number of plungers each arranged to engage in a separate compartment to compress the curd therein upon operation of the piston and cylinder unit 98. Each compartment can conveniently have dimensions to produce cheese blocks of a size suitable for retail distribution.

In a case in which the cheese vat 10 and drainage conveyor unit 11 provide more curd than can be handled by one tower 12, the curd can of course be fed to two or more towers 12 as shown in broken lines in FIG. 1, each tower 12 being provided with a separate turntable 13.

We claim:

1. A method of forming a block of cheese from prepared cheese curd, said method comprising the steps of:
   feeding the prepared curd into a tubular perforated column so as to build up a pillar of curd in the column with the curd being fed onto the top of the pillar, the curd in the lower portion of the pillar being compressed by the weight of superimposed curd to press out whey therefrom through the perforations in the column;
   extracting air and whey from the column so as to maintain a sub-atmospheric pressure therein during the feeding of the curd into the column;
   severing the lower end of the pillar of curd;
   depositing the mass of curd severed from the pillar into a cheese mould below the column;
   subjecting the mass of curd in the mould to a sub-atmospheric pressure within the range −0.5 to −1.0 bar;
   compressing the mass of curd in the mould at a pressure of at least 4 bar; and
   raising the sub-atmospheric pressure in the mould to atmospheric pressure while the mass of curd is being compressed in the mould;
   said mass of curd in the mould being compressed for sufficient time to consolidate the mass of curd into a block of cheese with a rind firm enough to permit handling of the block of cheese after ejection from the mould.

2. A method as claimed in claim 1, wherein the mass of curd is compressed by forcing into the mould a plunger which is a close sliding fit against the side walls of the mould.

3. A method as claimed in claim 1, wherein the mass of curd in the mould is compressed at a pressure within the range of 6–8 bar.

4. A method as claimed in claim 1, including the steps of:
   clamping the mould against the lower end of the column or against the lower end of a casing surrounding the column during the lowering of the pillar of curd and the severing of the lower end of the pillar;
   separating the mould from the column or casing; and then
   moving the mould into a pressing station in which the mass of curd is compressed at said pressure.

5. A method as claimed in claim 1, wherein the compressing of the mass of curd in the mould is effected at a first pressing station, and including the steps of:
   moving the mould into a plurality of additional pressing stations in succession; and
   compressing the mass of curd in the mould at each of the additional pressing stations.

6. A method as claimed in claim 5, wherein the mass of curd is compressed at said pressure for a period of time between 45 and 120 seconds at each pressing station.

7. A method as claimed in claim 1, wherein the mass of curd in the mould is subjected, prior to the compression thereof in the mould, to a lower sub-atmospheric pressure than the sub-atmospheric pressure in the column.

8. A method as claimed in claim 1, wherein the sub-atmospheric pressure in the column is in the range −0.6 to −0.9 bar, and the mass of curd in the mould is subjected to a sub-atmospheric pressure in the range −0.9 to −1.0 bar prior to the compression thereof in the mould.

9. A method as claimed in claim 1, wherein the compressing of the mass of curd in the mould is effected at a first pressing station, and including the steps of:
   moving the mould in succession into a plurality of additional pressing stations at each of which the curd is compressed in the mould and an unloading station at which the block of cheese is ejected from the mould; and then returning the mould directly to a loading station below the column for reception of another mass of curd.

10. A method as claimed in claim 9, including mounting a plurality of moulds on a turntable below the column and moving the turntable to index each mould in succession with the loading, pressing and unloading stations.

11. A method as claimed in claim 1, including the step of draining whey from the inside surfaces of the mould during compression of the mass of curd in the mould.

12. A method as claimed in claim 1, including the step of lining the mould internally with cloth or other suitable sheet material so as to become embedded in the rind formed on the outer surface of the cheese block during the compression of the mass of curd in the mould.

13. A method as claimed in claim 1, including the step of heating the walls of the mould during compression of the mass of curd to melt the fat in the surface layers of the cheese block and thereby facilitate formation of a rind.

14. An apparatus for forming blocks of cheese from prepared cheese curd, said apparatus comprising:
a tower having a hollow column therein;
first vacuum means for extracting air from the tower to obtain a sub-atmospheric pressure therein;
means for directing the curd into the top of the tower to form a pillar of curd in the column while the tower is at said sub-atmospheric pressure;
means for removing from the tower whey expressed from the lower end portion of the pillar of curd due to the weight of curd superimposed thereon;
the hollow column of the tower having apertures in the wall thereof for passage of whey pressed out of the curd;
a mould;
means for severing the lower end of the pillar of curd and depositing the mass of curd severed from the pillar into the mould;
second vacuum means for extracting air from the mould so as to subject the mass of curd therein to a sub-atmospheric pressure;
means operable to compress the mass of curd in the mould at a pressure of at least 4 bar to consolidate the mass of curd into a block of cheese; and
means to eject the block of cheese from the mould;
said second vacuum means further comprises means operable to raise the sub-atmospheric pressure in the mould to atmospheric pressure while the mass of curd is being compressed in the mould; and
said mass of curd in the mould being compressed for sufficient time to form on the block of cheese a rind firm enough to permit handling of the block of cheese after ejection from the mould.

15. An apparatus as claimed in claim 14, wherein the mould comprises upright side walls, a base integral with the side walls and having an opening therein, and a bottom plate mounted on the top of an upright rod extending through the opening in the base of the mould, said apparatus further comprising first elevator means operable to clamp the mould against the underside of the column of the tower for reception of the lower end of the pillar of curd, and second elevator means operable to engage the upright rod and raise and lower the bottom plate within the mould for support of the pillar of curd and for lowering of the pillar of curd.

16. An apparatus as claimed in claim 14, further comprising conveyor means operable to transport a plurality of moulds in succession into a loading station below the tower, at least one pressing station, and an unloading station, the pressing station being fitted with said means operable to compress the mass of curd in a mould registered with the pressing station.

17. An apparatus as claimed in claim 16, wherein the conveyor means comprises a turntable rotatable to register each mould in succession with each of said stations.

18. An apparatus as claimed in claim 14, wherein the means operable to compress the mass of curd in the mould comprises a plunger adapted to be a close sliding fit with the side walls of the mould and drive means for forcing the plunger into the mould to compress the mass of curd therein.

19. An apparatus as claimed in claim 16, wherein the pressing station comprises a vacuum chamber open at the lower end thereof, means for raising a mould in the pressing station into clamping engagement with the vacuum chamber to close the lower end thereof, and said second vacuum means serving to extract air from the chamber and the mould so as to subject the mass of curd in the mould to a sub-atmospheric pressure prior to compression of the curd in the mould.

20. An apparatus as claimed in claim 19, wherein the means operable to compress the mass of curd in the mould comprises a plunger mounted within the vacuum chamber in a close sliding fit with the side walls of the mould and drive means operable to force the plunger into the mould in clamping engagement with the vacuum chamber to compress the mass of curd therein.

21. An apparatus as claimed in claim 15, wherein the side walls of the mould are formed with apertures for drainage of whey pressed out of the mass of curd.

22. A method as claimed in claim 4, wherein the compressing of the mass of curd in the mould is effected at a first pressing station; and including moving the mould into a plurality of additional pressing stations in succession and compressing the mass of curd in the mould at each of the additional pressing stations.

23. A method as claimed in claim 5, including the step of heating the walls of the mould during compression of the mass of the curd to melt the fat in the surface layers of the cheese block and thereby facilitate formation of a rind.

24. A method as claimed in claim 9, including the step of heating the walls of the mould during compression of the mass of the curd to melt the fat in the surface layers of the cheese block and thereby facilitate formation of a rind.

25. A method of forming a block of cheese from prepared cheese curd, said method comprising the steps of:
feeding the prepared curd into a tubular perforated column so as to build up a pillar of curd in the column with the curd being fed onto the top of the pillar, the curd in the lower portion of the pillar being compressed by the weight of superimposed curd to press out whey therefrom through the perforations in the column;
extracting air and whey from the column so as to maintain a sub-atmospheric pressure therein during the feeding of the curd into the column;
severing the lower end of the pillar of curd;
depositing the mass of curd severed from the pillar into a cheese mould below the column;

moving the mould into a plurality of pressing stations in succession;

compressing the mass of curd in the mould at each of the pressing stations at a pressure of at least 4 bar, said mass of curd in the mould being successively compressed for sufficient time to consolidate the mass of curd into a block of cheese with a rind firm enough to permit handling of the block of cheese after ejection from the mould;

moving the mould into an unloading station at which the block of cheese is ejected from the mould; and returning the mould directly to a loading station below the column for receiption of another mass of curd.

26. A method as claimed in claim 25, including the steps of subjecting the mass of curd in the mould at least at the first of the pressing stations to a sub-atmospheric pressure within the range −0.5 to −1.0 bar and raising the sub-atmospheric pressure in the mould to atmospheric pressure while the mass of curd is being compressed in the mould at the first pressing station.

27. A method as claimed in claim 25, wherein the mass of curd is compressed at each of the pressing stations by forcing into the mould a plunger which is a close sliding fit against the side walls of the mould.

28. A method as claimed in claim 25, wherein the mass of curd in the mould is compressed at each of the pressing stations at a pressure within the range of 6–8 bar.

29. A method as claimed in claim 25, including the steps of:
clamping the mould against the lower end of the column or against the lower end of a casing surrounding the column during the lowering of the pillar of curd and the severing of the lower end of the pillar;

separating the mould from the column or casing; and then moving the mould into the first of the pressing stations in which the mass of curd is compressed at said pressure.

30. A method as claimed in claim 25, wherein the mass of curd is compressed at said pressure for a period of time between 45 and 120 seconds at each pressing station.

31. A method as claimed in claim 26, wherein the mass of curd in the mould is subjected, prior to the compression thereof in the mould, to a lower sub-atmospheric pressure than the sub-atmospheric pressure in the column.

32. A method as claimed in claim 26, wherein the sub-atmospheric pressure in the column is in the range −0.6 to −0.9 bar, and the mass of curd in the mould is subjected to a sub-atmospheric pressure in the range −0.9 to −1.0 bar prior to the compression thereof in the mould.

33. A method as claimed in claim 25, including mounting a plurality of moulds on a turntable below the column and moving the turntable to index each mould in succession with the loading, pressing and unloading stations.

34. A method as claimed in claim 25, including the step of draining whey from the inside surfaces of the mould during compression of the mass of curd in the mould.

35. A method as claimed in claim 25, including the step of lining the mould internally with cloth or other suitable sheet material so as to become embedded in the rind formed on the outer surface of the cheese block during the compression of the mass of curd in the mould.

36. A method as claimed in claim 25, including the step of heating the walls of the mould during compression of the mass of curd to melt the fat in the surface layers of the cheese block and thereby facilitate formation of a rind.

37. An apparatus for forming blocks of cheese from prepared cheese curd, said apparatus comprising:
a tower having a hollow column therein;
vacuum means for extracting air from the tower to obtain a sub-atmospheric pressure therein;
means for directing the curd into the top of the tower to form a pillar of curd in the column while the tower is at the sub-atmospheric pressure;
means for removing from the tower whey expressed from the lower end portion of the pillar of curd due to the weight of curd superimposed thereon;
the hollow column of the tower having apertures in the wall thereof for passage of whey pressed out of the curd;
a plurality of moulds;
conveyor means operable to transport the plurality of moulds in succession into a loading station below the tower, a plurality of pressing stations, and an unloading station;
means for severing the lower end of the pillar of curd and depositing the mass of curd severed from the pillar into the mould registered with the loading station;
means at each of the pressing stations operable to compress the mass of curd in the mould registered with the pressing station at a pressure of at least 4 bar to consolidate the mass of curd into a block of cheese; and
means at the unloading station to eject the block of cheese from the mould;
said mass of curd in the mould being successively compressed for sufficient time to form on the block of cheese a rind firm enough to permit handling of the block of cheese after ejection from the mould.

38. An apparatus as claimed in claim 37, further comprising second vacuum means at least at the first of the pressing stations for extracting air from the mould registered with the pressing station so as to subject the mass of curd therein to a sub-atmospheric pressure and for raising the sub-atmospheric pressure in the mould to atmospheric pressure while the mass of curd is being compressed in the mould.

39. An apparatus as claimed in claim 37, wherein each mould comprises upright side walls, a base integral with the side walls having an opening therein, and a bottom plate mounted on the top of an upright rod extending through the opening in the base of the mould, said apparatus further comprising first elevator means operable to claim the registered mould against the underside of the column of the tower for reception of the lower end of the pillar of curd, and second elevator means operable to engage the upright rod and raise and lower the bottom plate within the mould for support of the pillar of curd and for lowering of the pillar of curd.

40. An apparatus as claimed in claim 37, wherein the conveyor means comprises a turntable rotatable to register each mould in succession with each of the stations.

41. An apparatus as claimed in claim 37, wherein the means operable to compress the mass of curd in each mould comprises a plunger adapted to be a close sliding fit with the side walls of the mould and drive means for forcing the plunger into the mould to compress the mass of curd therein.

42. An apparatus as claimed in claim 38, wherein the first pressing station comprises a vacuum chamber open at the lower end thereof, means for raising a mould in the pressing station into clamping engagement with the vacuum chamber to close the lower end thereof, and the second vacuum means serving to extract air from the chamber and the mould so as to subject the mass of curd in the mould to a sub-atmospheric pressure prior to compression of the curd in the mould.

43. An apparatus as claimed in claim 42, wherein the means operable to compress the mass of curd in each mould comprises a plunger mounted within the vacuum chamber in a close sliding fit with the side walls of the mould and drive means operable to force the plunger into the mould in clamping engagement with the vacuum chamber to compress the mass of curd therein.

44. An apparatus as claimed in claim 39, wherein the side walls of the mould are formed with apertures for drainage of whey pressed out of the mass of curd.

* * * * *